US012491800B2

(12) United States Patent
Han et al.

(10) Patent No.: US 12,491,800 B2
(45) Date of Patent: Dec. 9, 2025

(54) SYSTEM AND METHOD FOR CONTROLLING A SEAT-INTERLOCKING LEG REST

(71) Applicants: HYUNDAI MOTOR COMPANY, Seoul (KR); KIA CORPORATION, Seoul (KR)

(72) Inventors: Kug Hun Han, Seoul (KR); Hoon Bok Lee, Hwaseong-si (KR); Yo Han Kim, Ansan-si (KR); Mun Seung Kang, Suwon-si (KR); Dong Hoon Keum, Busan (KR); Deok Soo Lim, Hwaseong-si (KR); Dong Hoon Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 318 days.

(21) Appl. No.: 18/119,132

(22) Filed: Mar. 8, 2023

(65) Prior Publication Data

US 2024/0083305 A1 Mar. 14, 2024

(30) Foreign Application Priority Data

Sep. 14, 2022 (KR) .................. 10-2022-0115700

(51) Int. Cl.
*B60N 2/02* (2006.01)
*B60N 2/06* (2006.01)
(Continued)

(52) U.S. Cl.
CPC ....... *B60N 2/0244* (2013.01); *B60N 2/02246* (2023.08); *B60N 2/06* (2013.01); *B60N 2/1635* (2013.01); *B60N 2/995* (2018.02)

(58) Field of Classification Search
CPC .. B60N 2/995; B60N 2/0244; B60N 2/02246; B60N 2/1635; B60N 2/0035;
(Continued)

(56) References Cited

U.S. PATENT DOCUMENTS

2002/0113477 A1* 8/2002 Uchiyama ............ A47C 1/0242
297/362.11
2013/0049669 A1* 2/2013 Han ................... B60N 2/02246
318/565
(Continued)

FOREIGN PATENT DOCUMENTS

JP H11299570 A 11/1999
JP 2007253809 A 10/2007
(Continued)

OTHER PUBLICATIONS

Electron_one. "Hall Effect Sensors and Applications." OnElectronTech, Apr. 22, 2020, www.onelectrontech.com/hall-effect-sensor-application-position-speed-flow-sensing/ (Year: 2020).*

(Continued)

*Primary Examiner* — Matthias S Weisfeld
*Assistant Examiner* — Hyang Ahn
(74) *Attorney, Agent, or Firm* — Lempia Summerfield Katz LLC (57) ABSTRACT

A seat-interlocking leg rest control system includes: a first actuator configured to move a seat for a vehicle, the seat including a seat cushion and a seatback, in a forward-backward direction or an upward-downward direction of the vehicle; a second actuator configured to rotate a leg rest, rotatably coupled to the front end portion of the seat cushion, in the upward-downward direction; and a controller connected to the first actuator and the second actuator to control operation of the second actuator such that the rotation angle of the leg rest is limited based on the position of the seat.

15 Claims, 9 Drawing Sheets

(51) Int. Cl.
*B60N 2/16* (2006.01)
*B60N 2/90* (2018.01)

(58) Field of Classification Search
CPC ...... B60N 2/0268; B60N 2/0272; B60N 2/16; B60N 2/04; B60Y 2400/3012
USPC .......................................................... 709/49
See application file for complete search history.

(56) References Cited

U.S. PATENT DOCUMENTS

| 2017/0158086 | A1* | 6/2017 | Kwon ...................... B60N 2/16 |
| 2018/0222350 | A1* | 8/2018 | Hirayama .............. B60N 2/162 |
| 2020/0031251 | A1 | 1/2020 | Bocchino et al. |
| 2020/0139851 | A1* | 5/2020 | Oshima .................... A47C 7/38 |
| 2020/0139853 | A1* | 5/2020 | Nawrocki ................ B60N 2/16 |
| 2022/0144141 | A1* | 5/2022 | Kondrad ................ B60N 2/005 |

FOREIGN PATENT DOCUMENTS

| JP | 2013132942 | A | 7/2013 | |
| KR | 20190133688 | A | 12/2019 | |
| KR | 102061841 | B1 | 1/2020 | |
| KR | 102061845 | B1 | 1/2020 | |
| WO | WO-2018016771 | A1 * | 1/2018 | ............. B60N 2/995 |

OTHER PUBLICATIONS

Melexis, "PCB-Less Hall-Effect Latch for Seat Motor Positioning in Automotive Applications." Feb. 26, 2019, www.melexis.com/en/news/2019/26feb2019-pcb-less-hall-effect-latch-seat-motor-positioning (Year: 2019).*

* cited by examiner

FIG. 9

SYSTEM AND METHOD FOR CONTROLLING A SEAT-INTERLOCKING LEG REST

CROSS-REFERENCE TO RELATED APPLICATION

This application claims priority to and the benefit of Korean Patent Application No. 10-2022-0115700, filed on Sep. 14, 2022, in the Korean Intellectual Property Office, the entire disclosure of which is incorporated herein by reference.

BACKGROUND

1. Field of the Disclosure

The present disclosure relates to a system and method for controlling a seat-interlocking leg rest, and more particularly to a technology for controlling the rotation angle of a leg rest based on the position of a seat in a forward-backward direction or an upward-downward direction.

2. Description of the Related Art

A vehicle seat is provided with various convenience devices to improve occupant comfort. One of such convenience devices is a leg rest device, which supports the legs of an occupant sitting on a vehicle seat.

A conventional leg rest device includes a leg rest, which is rotatably mounted to a front end portion of a seat cushion configured to support the buttocks of an occupant, and an actuator, which causes the leg rest to rotate or slide. An occupant may manipulate an operation switch provided in the interior of a vehicle to drive the actuator.

However, when the seat moves in the forward-backward direction or the upward-downward direction of the vehicle, the deployed leg rest may collide with another part provided in the interior of the vehicle. This may cause damage to the leg rest or damage to the actuator of the leg rest.

The information disclosed in this Background of the disclosure section is only to enhance understanding of the general background of the disclosure. Therefore, the Background of the disclosure section should not be taken as an acknowledgement or any form of suggestion that the information in this section forms the related art already known to a person of ordinary skill in the art.

SUMMARY

Therefore, the present disclosure has been made in view of the above problems. It is an object of the present disclosure to limit the rotation angle of a leg rest according to the position of a seat in a forward-backward direction or an upward-downward direction. Further, it is an object of the present disclosure to allow the leg rest to rotate within a limited rotation angle range, thereby preventing damage to the leg rest or damage to another part provided in the interior of a vehicle.

In accordance with an aspect of the present disclosure, the above and other objects can be accomplished by the provision of a seat-interlocking leg rest control system. The control system includes: a first actuator configured to move a seat for a vehicle, the seat including a seat cushion and a seatback, in a forward-backward direction or an upward-downward direction of the vehicle; a second actuator configured to rotate a leg rest, rotatably coupled to the front end portion of the seat cushion, in the upward-downward direction; and a controller connected to the first actuator and the second actuator to control operation of the second actuator such that the rotation angle of the leg rest is limited based on the position of the seat.

The first actuator may include a first drive motor configured to cause the seat to slide in the forward-backward direction and a second drive motor configured to move the seat in the upward-downward direction. The second actuator may include a third drive motor coupled to the front end portion of the seat cushion to rotate the leg rest. The seat-interlocking leg rest control system may further include a sensing unit configured to detect the number of revolutions of each of the first drive motor, the second drive motor, and the third drive motor, the number of revolutions being the number of revolutions counted by accumulating a number of forward or reverse revolutions that the drive motor rotates. The controller may control operation of the third drive motor based on at least one of the of the first drive motor or the number of revolutions of the second drive motor detected by the sensing unit.

Each of the first drive motor and the second drive motor may be provided with a Hall sensor. The sensing unit may sense rotation of the first drive motor and the second drive motor using the Hall sensor.

The controller may determine the moving distance of the seat in the forward-backward direction based on the number of revolutions of the first drive motor detected by the sensing unit. The controller may control operation of the third drive motor when the seat is moved forwards beyond a predetermined first position from the rearmost position.

Upon determining that the seat is located at the predetermined first position using the sensing unit, the controller may control operation of the third drive motor such that the leg rest is rotated to the lowermost position or a predetermined position.

The controller may control operation of the third drive motor such that the rotation angle of the leg rest is limited according to a distance by which the seat is moved from the predetermined first position toward the frontmost position.

The controller may divide the distance from the predetermined first position to the frontmost position of the seat into predetermined regions. The controller may control operation of the third drive motor such that the rotation angle of the leg rest is limited in stages based on the predetermined regions.

The controller may determine the moving distance of the seat in the upward-downward direction based on the number of revolutions of the second drive motor detected by the sensing unit. The controller may control operation of the third drive motor when the seat is moved upwards beyond a predetermined second position from the lowermost position.

Upon determining that the seat moving in the upward-downward direction is located at the predetermined second position using the sensing unit, the controller may control operation of the third drive motor such that the leg rest is rotated to the lowermost position.

The controller may control operation of the third drive motor such that the rotation angle of the leg rest is limited according to a distance by which the seat is moved from the predetermined second position toward the uppermost position.

The controller may divide the distance from the predetermined second position to the uppermost position of the seat into predetermined regions. The controller may control operation of the third drive motor such that the rotation angle of the leg rest is limited in stages based on the predetermined regions.

In accordance with another aspect of the present disclosure, the above and other objects can be accomplished by the provision of a seat-interlocking leg rest control method. The control method includes: detecting the position of a seat in the forward-backward direction or the position of the seat in the upward-downward direction. The control method also includes limiting the rotation angle of a leg rest, rotatably coupled to the seat, based on at least one of the detected position of the seat in the forward-backward direction or the detected position of the seat in the upward-downward direction.

The seat-interlocking leg rest control method may further include, before the limiting, setting a predetermined first position in a moving track of the seat in the forward-backward direction and comparing the detected position of the seat with the predetermined first position. The limiting may be performed such that the rotation angle of the leg rest is limited when the seat is located ahead of the predetermined first position.

The seat-interlocking leg rest control method may further include setting a limited rotation angle of the leg rest based on the distance from the predetermined first position to the position of the seat ahead of the first predetermined position and comparing the limited rotation angle with the current rotation angle of the leg rest. When the current rotation angle of the leg rest is greater than the limited rotation angle, the limiting may be performed such that the leg rest is rotated to the limited rotation angle.

The seat-interlocking leg rest control method may further include, before the limiting, setting a predetermined second position in a moving track of the seat in the upward-downward direction and comparing the detected position of the seat with the predetermined second position. The limiting may be performed such that the rotation angle of the leg rest is limited when the seat is located above the predetermined second position.

The seat-interlocking leg rest control method may further include setting a limited rotation angle of the leg rest based on the distance from the predetermined second position to the position of the seat above the predetermined second position and comparing the limited rotation angle with the current rotation angle of the leg rest. When the current rotation angle of the leg rest is greater than the limited rotation angle, the limiting may be performed such that the leg rest is rotated to the limited rotation angle.

BRIEF DESCRIPTION OF THE DRAWINGS

The above and other objects, features, and other advantages of the present disclosure should be more clearly understood from the following detailed description taken in conjunction with the accompanying drawings, in which.

DETAILED DESCRIPTION OF EMBODIMENTS

Various embodiments are described more fully herein with reference to the accompanying drawings, in which only some embodiments of the present disclosure are shown. Specific structural and functional details disclosed herein are merely representative for the purpose of describing embodiments of the present disclosure. The present disclosure, however, may be embodied in many alternative forms, and should not be construed as being limited to the embodiments set forth herein.

Accordingly, while embodiments of the disclosure are capable of being variously modified and taking alternative forms, embodiments thereof are shown by way of example in the drawings and are described in detail herein. It should be understood, however, that there is no intent to limit the present disclosure to the particular embodiments disclosed. On the contrary, embodiments are to cover all modifications, equivalents, and alternatives falling within the scope of the disclosure.

It should be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of embodiments of the present disclosure.

It should be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of embodiments of the disclosure. As used herein, the singular forms "a", "an", and "the", are intended to include the plural forms as well, unless the context clearly indicates otherwise. It should be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those of ordinary skill in the art. The terms, such as ones defined in common dictionaries, should be interpreted as having the same meanings as terms in the context of pertinent technology, and should not be interpreted as having ideal or excessively formal meanings unless clearly defined in the specification. When a component, device, element, or the like of the present disclosure is described as having a purpose or performing an operation, function, or the like, the component, device, or element should be considered herein as being "configured to" meet that purpose or perform that operation or function.

Hereinafter, embodiments of the present disclosure are described in detail with reference to the accompanying drawings. The same reference numerals denote the same components throughout the drawings.

A controller 30 and a sensing unit 40 according to an embodiment of the present disclosure may be implemented through a processor configured to execute the operation to be described below using nonvolatile memory. The memory is configured to store an algorithm for controlling the operation of various components of a vehicle or data related to a software command for executing the algorithm, and data stored in the memory. Here, the memory and the processor may be implemented as individual chips. Alternatively, the memory and the processor may be implemented as a single integrated chip. The processor may alternatively take the form of one or more processors.

Figure 1:
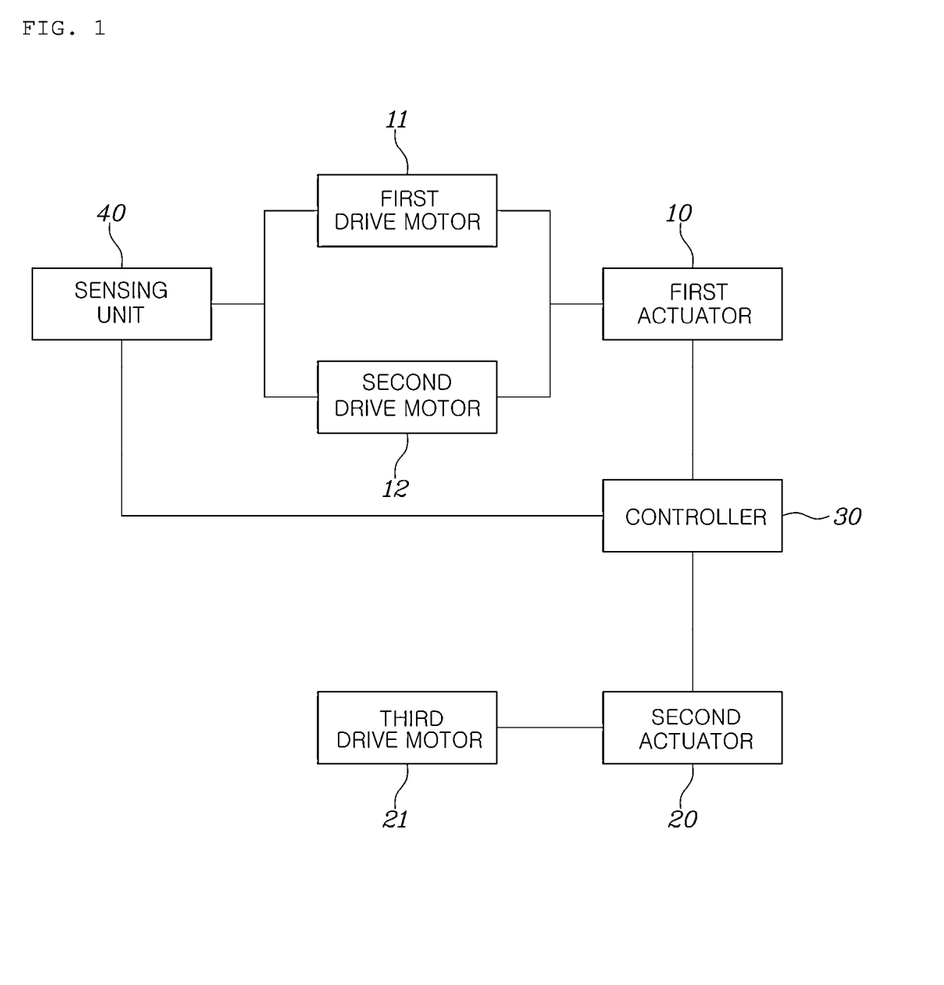
FIG. 1 is a block diagram showing a configuration of a seat-interlocking leg rest control system according to an embodiment of the present disclosure.
Figure 2:
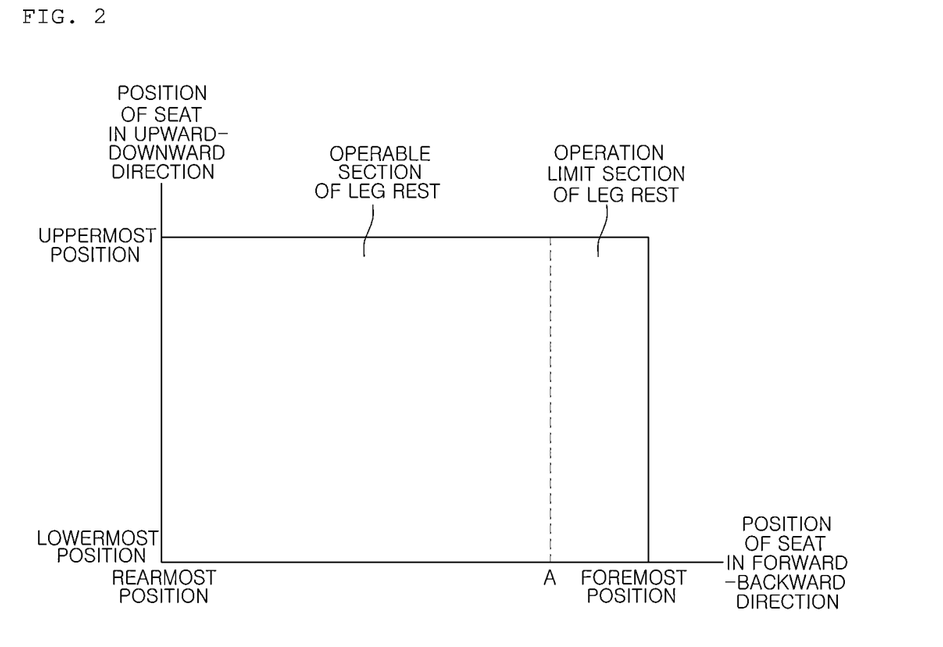
FIG. 2 is a graph showing an operation limit section of a leg rest according to movement of a seat in a forward-backward direction in the seat-interlocking leg rest control system according to an embodiment of the present disclosure.
Figure 3:
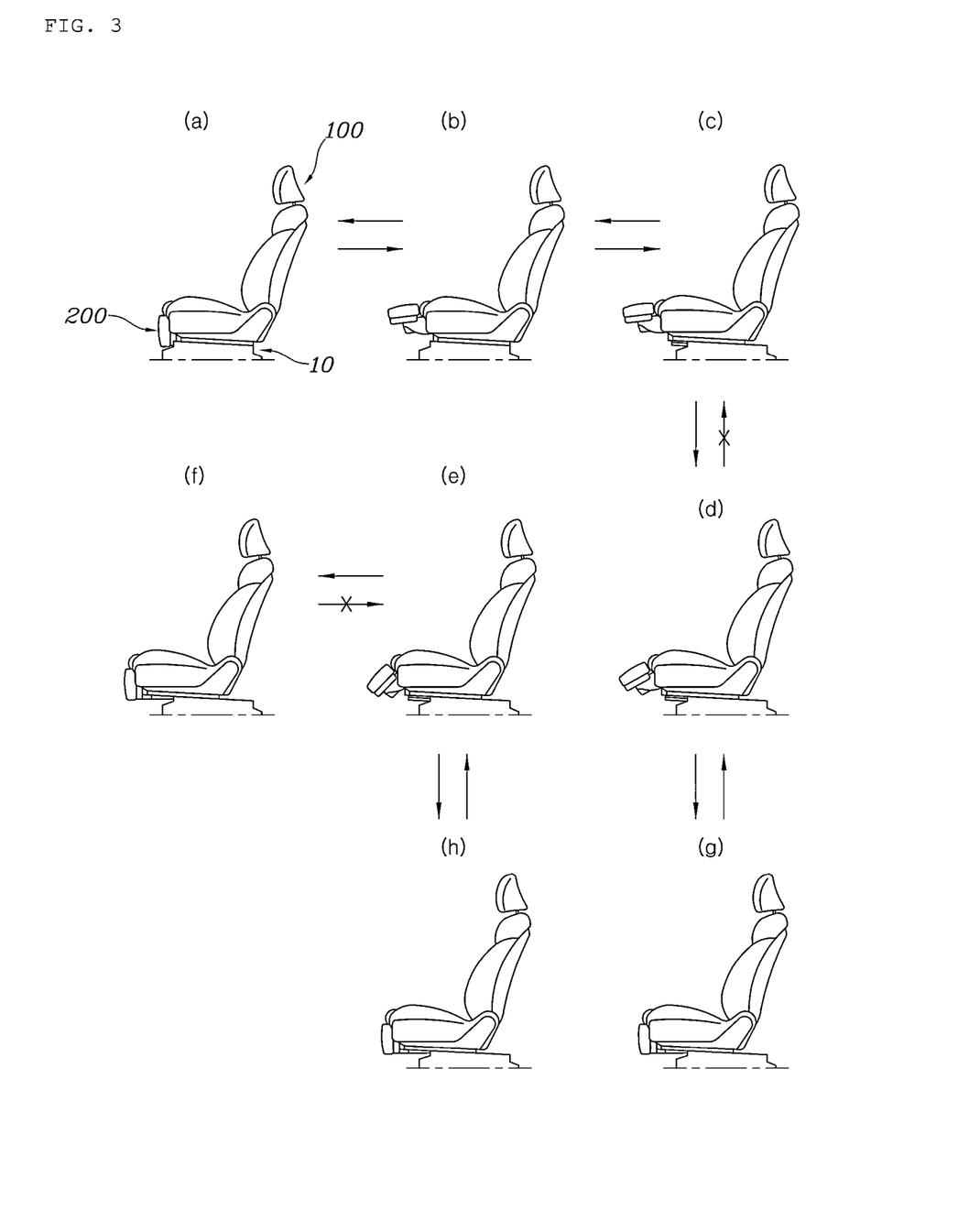
FIG. 3 is a view showing control of rotation of the leg rest according to the position of the seat in the forward-backward direction by the seat-interlocking leg rest control system according to an embodiment of the present disclosure.
Figure 4:
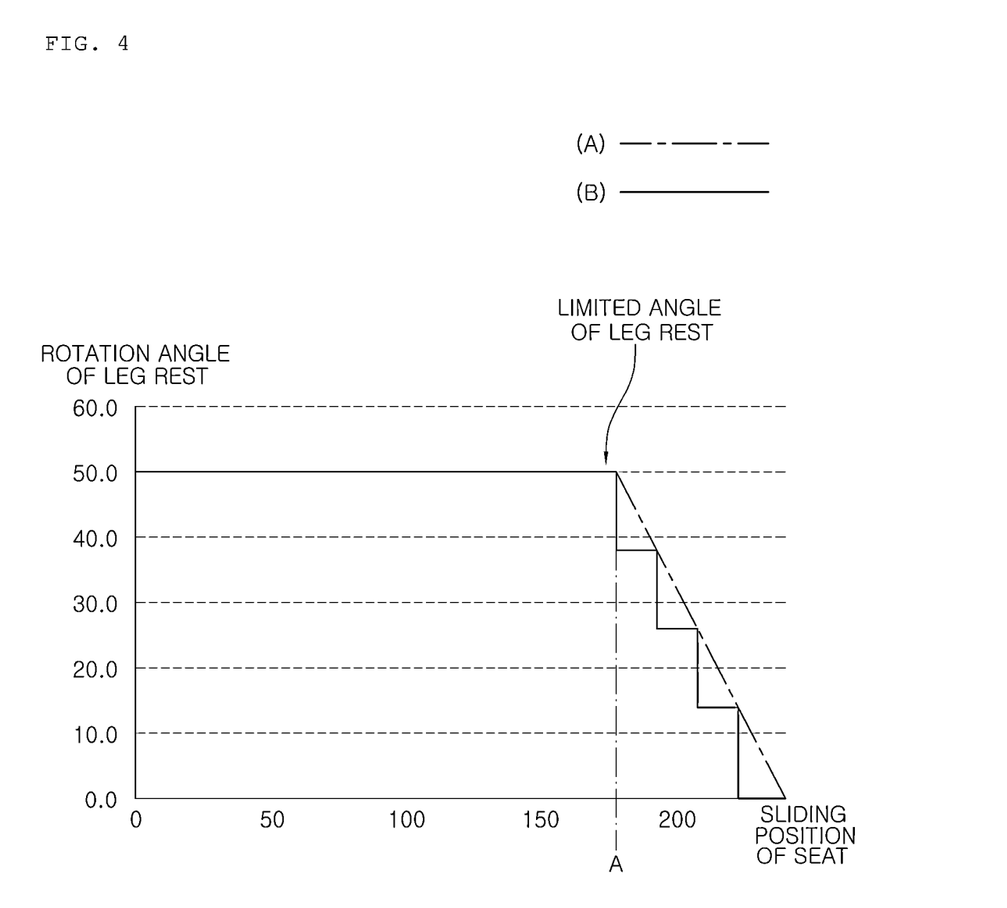
FIG. 4 is a graph showing a limited rotation angle of the leg rest according to movement of the seat in the forward-backward direction in the seat-interlocking leg rest control system according to an embodiment of the present disclosure.
Figure 5:
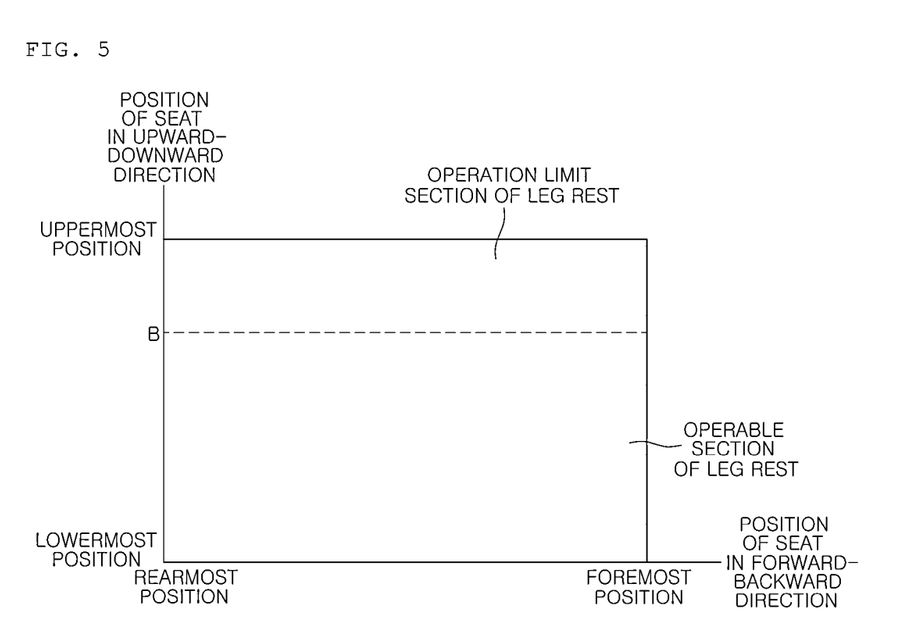
FIG. 5 is a graph showing an operation limit section of the leg rest according to movement of the seat in an upward-downward direction in the seat-interlocking leg rest control system according to an embodiment of the present disclosure.
Figure 6:
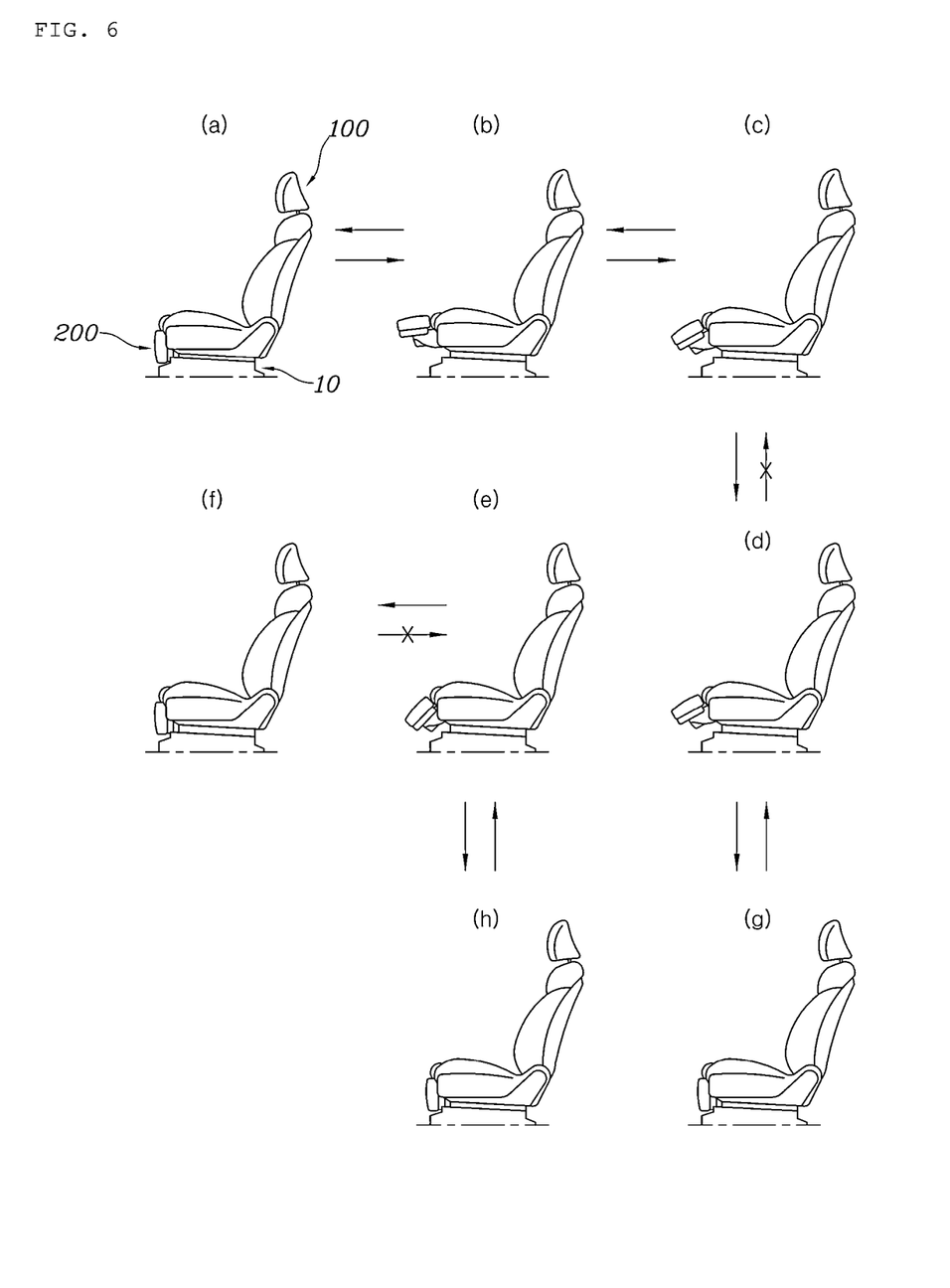
FIG. 6 is a view showing control of rotation of the leg rest according to the position of the seat in the upward-downward direction by the seat-interlocking leg rest control system according to an embodiment of the present disclosure.
Figure 7:
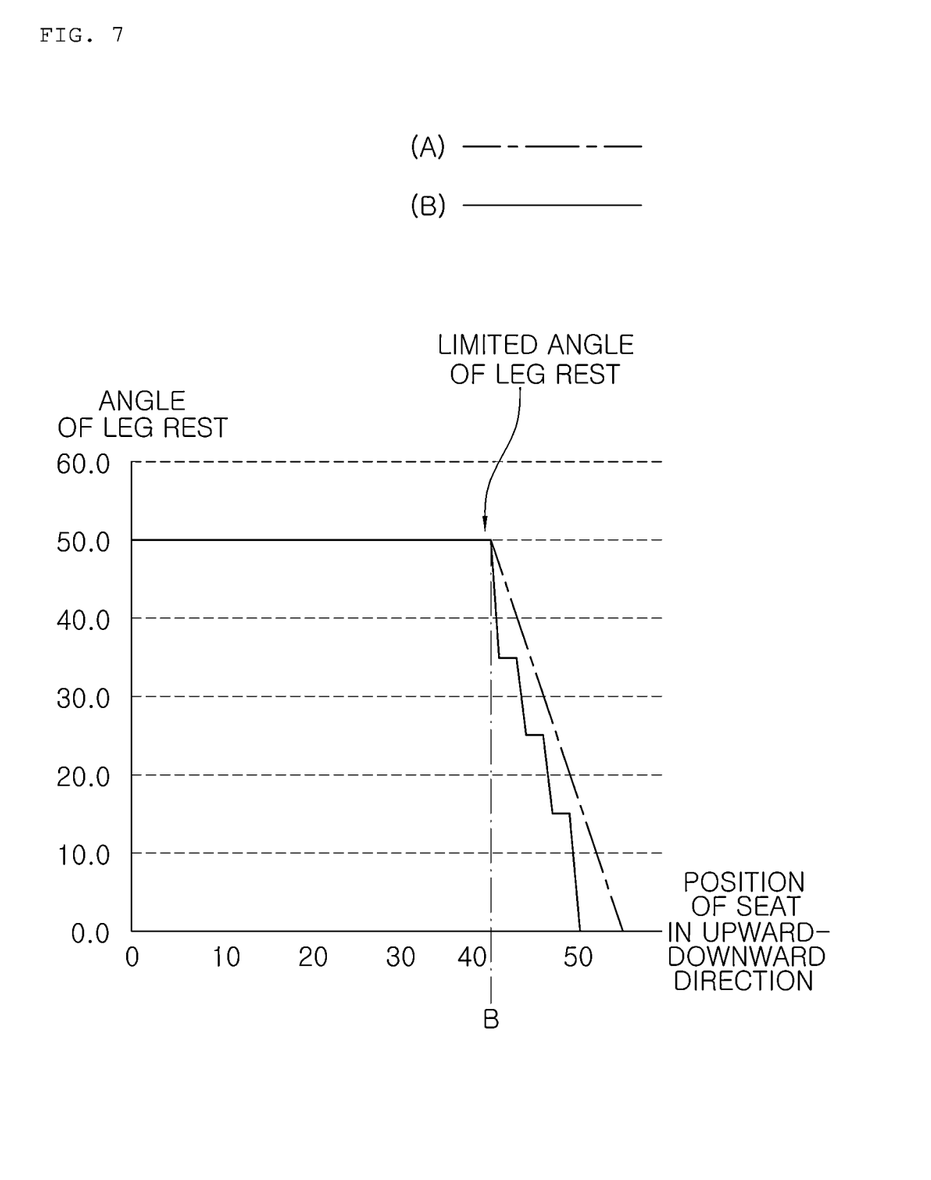
FIG. 7 is a graph showing a limited rotation angle of the leg rest according to movement of the seat in the upward-downward direction in the seat-interlocking leg rest control system according to an embodiment of the present disclosure.

FIG. 1 is a block diagram showing a configuration of a seat-interlocking leg rest control system according to an embodiment of the present disclosure. FIG. 2 is a graph showing an operation limit section of a leg rest 200 according to movement of a seat 100 in the forward-backward direction in the seat-interlocking leg rest control system according to an embodiment of the present disclosure. FIG. 3 is a view showing control of rotation of the leg rest 200 according to the position of the seat 100 in the forward-backward direction by the seat-interlocking leg rest control system according to an embodiment of the present disclosure. FIG. 4 is a graph showing a limited rotation angle of the leg rest 200 according to movement of the seat 100 in the forward-backward direction in the seat-interlocking leg rest control system according to an embodiment of the present disclosure. FIG. 5 is a graph showing an operation limit section of the leg rest 200 according to movement of the seat 100 in the upward-downward direction in the seat-interlocking leg rest control system according to an embodiment of the present disclosure. FIG. 6 is a view showing control of rotation of the leg rest 200 according to the position of the seat 100 in the upward-downward direction by the seat-interlocking leg rest control system according to an embodiment of the present disclosure. FIG. 7 is a graph showing a limited rotation angle of the leg rest 200 according to movement of the seat 100 in the upward-downward direction in the seat-interlocking leg rest control system according to an embodiment of the present disclosure.

Hereinafter, an embodiments of a seat-interlocking leg rest control system according to the present disclosure are described with reference to FIGS. 1-7.

A seat 100, on which an occupant sits, may be provided in the interior of a vehicle. The seat 100 may be coupled to the floor of the vehicle so as to be movable in the forward-backward direction and the upward-downward direction of the vehicle.

The seat 100 of the vehicle may include a seat cushion, which supports the buttocks and the upper legs of an occupant, and a seatback, which supports the back of an occupant. The seat 100 may further include a leg rest 200, which is coupled to the front end portion of the seat cushion to support the lower legs of an occupant. The leg rest 200 may be coupled to the front end portion of the seat cushion so as to be rotatable in the forward-backward direction of the vehicle. An occupant may manipulate a switch for controlling rotation of the leg rest 200 to deploy the leg rest 200 or rotate the leg rest 200 back to a position below the seat cushion.

However, there is a risk of the leg rest 200 being damaged due to collision with another part provided in the interior of the vehicle (hereinafter referred to as an "interior part") according to or depending on the position of the seat 100 in the forward-backward direction or the upward-downward direction.

In order to prevent this problem, the present disclosure provides a system for controlling the leg rest 200 according to the position of the seat 100 in the forward-backward direction or the upward-downward direction.

The seat-interlocking leg rest control system according to the present disclosure includes a first actuator 10, which moves the vehicle seat 100, which includes a seat cushion and a seatback, in the forward-backward direction or the upward-downward direction of the vehicle. The control system also includes a second actuator 20, which rotates the leg rest 200, which is rotatably coupled to the front end portion of the seat cushion, in the upward-downward direction. The control system further includes a controller 30, which is connected to the first actuator 10 and the second actuator 20 to control operation of the second actuator 20 such that the rotation angle of the leg rest 200 is limited based on the position of the seat 100.

As shown in FIG. 1, the seat 100, which is disposed on the floor of the vehicle, may be coupled to a rail mounted on the floor of the vehicle so as to be slidable in the forward-backward direction of the vehicle. The first actuator 10 may be disposed between the rail and the seat 100 and may move the seat 100 along the rail in the forward-backward direction of the vehicle or may move the seat 100 coupled to the rail in the upward-downward direction.

In this case, the seat 100 may be connected to the first actuator 10 via a four-bar linkage mechanism. The seat 100 may be moved in the upward-downward direction by rotation of the four-bar linkage mechanism.

An operation switch for driving the first actuator 10 may be provided on the seat 100 or in the interior of the vehicle. The first actuator 10 may be driven by manipulation of the operation switch by an occupant, thereby moving the seat 100 in the forward-backward direction or the upward-downward direction of the vehicle.

The leg rest 200, which is rotatably coupled to the front end portion of the seat cushion, may be coupled to a rotary shaft of the second actuator 20, and thus may be rotated in the upward-downward direction by the second actuator 20.

The first actuator 10 and the second actuator 20 may be driven by manipulation of the operation switch provided on the seat 100 or in the interior of the vehicle, thereby rotating the leg rest 200 while moving the seat 100 in the forward-backward direction or the upward-downward direction of the vehicle. In some embodiments, the first actuator 10 and the second actuator 20 may be driven independently.

When the leg rest 200 is rotated upwards, the controller 30 may limit the rotation angle of the leg rest 200 according to the position of the seat 100 in the forward-backward direction or the upward-downward direction. The controller 30 may rotate the leg rest 200 downwards based on the limited rotation angle in order to prevent the leg rest 200 from colliding with the interior part of the vehicle.

When the seat 100 is a driver's seat, the interior part of the vehicle may be a steering wheel or a dashboard. When the seat 100 is a front passenger seat, the interior part of the vehicle may be a glove compartment or a dashboard. When the seat 100 is a rear seat, the interior part of the vehicle may be a front seat.

The controller 30 may limit the rotation angle of the leg rest 200 and may control the second actuator 20 to rotate the leg rest 200 downwards based on the limited rotation angle. The leg rest 200 or the second actuator 20 are thereby prevented from being damaged due to collision between the interior part of the vehicle and the leg rest 200.

The first actuator 10 may include a first drive motor 11, which causes the seat 100 to slide in the forward-backward direction, and a second drive motor 12, which moves the seat 100 in the upward-downward direction. The second actuator 20 may include a third drive motor 21, which is coupled to the front end portion of the seat cushion to rotate the leg rest 200. The seat-interlocking leg rest control system may further include a sensing unit 40 for detecting the number of revolutions of each of the first, second, and third drive motors 11, 12, and 21, the number of revolutions being the number of revolutions counted by accumulating a number forward or reverse revolutions that the drive motor rotates. The controller 30 may control operation of the third drive motor 21 based on at least one of the number of revolutions of the first drive motor 11 or the number of revolutions of the second drive motor 12 detected by the sensing unit 40.

In detail, the first drive motor 11 of the first actuator 10 may move the seat 100 connected to the rail in the forward-backward direction of the vehicle. The second drive motor 12 of the first actuator 10 may be connected to a four-bar linkage mechanism, which connects the seat 100 to the rail and moves the seat 100 in the upward-downward direction and may operate the four-bar linkage mechanism.

In addition, the third drive motor 21 of the second actuator 20 may be connected to the rotary shaft of the leg rest 200 to rotate the leg rest 200.

When the first drive motor 11 and the second drive motor 12 are driven in response to operation of the switch, the sensing unit 40, which is connected to the first drive motor 11 and the second drive motor 12, may detect the number of revolutions of the first drive motor 11 and the second drive motor 12.

The controller 30 may determine the position of the seat 100 in the forward-backward direction and the upward-downward direction based on the number of revolutions of the first drive motor 11 and the second drive motor 12 detected by the sensing unit 40.

In addition, the controller 30 may control operation of the third drive motor 21 based on the position of the seat 100 in the forward-backward direction and the upward-downward direction to limit the rotation angle of the leg rest 200.

Each of the first drive motor 11 and the second drive motor 12 may be provided with a Hall sensor. The sensing unit 40 may sense rotation of the first drive motor 11 and the second drive motor 12 using the Hall sensor.

The Hall sensor may be coupled to the rotary shaft of each of the first drive motor 11 and the second drive motor 12 to sense rotation of the rotary shaft. The Hall sensor may be connected to the sensing unit 40 to enable the sensing unit 40 to detect the number of revolutions of each of the first drive motor 11 and the second drive motor 12 and to transmit the detected number of revolutions to the controller 30.

The Hall sensor provided at each of the first drive motor 11 and the second drive motor 12 is merely given by way of example. Any of various other sensors may be used, so long as the same is capable of sensing rotation of the first drive motor 11 and the second drive motor 12 to determine the position of the seat 100.

The controller 30 may determine the moving distance of the seat 100 in the forward-backward direction based on the number of revolutions of the first drive motor 11 detected by the sensing unit 40. When the seat 100 is moved forward beyond a predetermined first position from the rearmost position, the controller 30 may control operation of the third drive motor 21.

As shown in FIG. 2, a rotation limit section of the leg rest 200 according to movement of the seat 100 in the forward-backward direction may be set. The point A in FIG. 2 may correspond to the predetermined first position.

The first position may be variously set by a designer depending on the type of vehicle or the type of seat 100.

As shown in FIG. 3, the seat 100 may be moved forward from the rearmost position in the order from (a)-(f). As illustrated in FIG. 3, the seat corresponding to position(c) shows the state in which the seat 100 reaches the first position. The controller 30 may limit the rotation angle of the leg rest 200 when the seat 100 is moved beyond the first position. In addition, the controller 30 may control the rotation angle of the third drive motor 21 based on the limited rotation angle.

The controller 30 may determine whether the seat 100 is moved forward beyond the predetermined first position from the rearmost position using the sensing unit 40. Upon determining that the seat 100 is moved forward beyond the first position, the controller 30 may control the third drive motor 21 to rotate the leg rest 200 downward.

Upon determining that the seat 100 is located at the predetermined first position using the sensing unit 40, the controller 30 may control operation of the third drive motor 21 such that the leg rest 200 is rotated to the lowermost position or a predetermined position.

In a first embodiment, the controller 30 rotates the leg rest 200 to the lowermost position when the seat 100 is moved beyond the first position. Upon determining that the position of the seat 100 in the forward-backward direction corresponds to the first position or a position ahead of the first position, the controller 30 may perform control such that, when the leg rest 200 is in a deployed state, the leg rest 200 is rotated to the lowermost position or such that, when the leg rest 200 is in a non-deployed state, the rotation angle of the leg rest 200 is limited to 0 degrees and thus the leg rest 200 is prevented from being deployed.

Positions (g) and (h) of FIG. 3 show the first embodiment.

Accordingly, it is possible to completely prevent collision between the leg rest 200 and the interior part of the vehicle.

In addition, when an occupant manipulates the operation switch such that the leg rest 200 is rotated beyond the limited rotation angle, the controller 30 may generate a warning signal so that the occupant is capable of recognizing limitation in the rotation angle of the leg rest 200 due to the position of the seat 100.

The controller 30 may control operation of the third drive motor 21 such that the rotation angle of the leg rest 200 is limited according to the distance by which the seat 100 is moved forward from the predetermined first position toward the foremost or frontmost position.

In a second embodiment in which the controller 30 rotates the leg rest 200 downward when the seat 100 is moved beyond the first position, the controller 30 may gradually reduce the allowable rotation angle of the leg rest 200 at a predetermined rate (refer to the slope indicated by the line (A) shown in the graph of FIG. 4) as the seat 100 is moved forwards beyond the first position, which corresponds to the point A, toward the foremost or frontmost position. Accordingly, the leg rest 200 may be gradually rotated downward as the seat 100 is moved forward beyond the first position.

Accordingly, even when the seat 100 is moved beyond the first position, the rotation angle of the leg rest 200 is limited to a certain degree so that the leg rest 200 is capable of being rotated to the limited rotation angle. As a result, the leg rest 200 may be rotated within a reduced or minimum required range.

The controller 30 may divide the distance from the predetermined first position to the foremost or frontmost position of the seat 100 into predetermined regions. The controller 30 may control operation of the third drive motor 21 such that the rotation angle of the leg rest 200 is limited in stages from the region closest to the first position to the region closest to the foremost position.

In a third embodiment in which the controller 30 rotates the leg rest 200 downward when the seat 100 is moved beyond the first position, the controller 30 may divide the distance from the first position, which corresponds to the point A, to the foremost position of the seat 100 into predetermined regions. The controller 30 may reduce the allowable rotation angle of the leg rest 200 in stages from the region closest to the first position to the region closest to the foremost position, as indicated by the line (B) shown in the graph of FIG. 4. Accordingly, the controller 30 may perform control such that the leg rest 200 is rotated downward to the limited rotation angle set for each section as the seat 100 is moved forwards.

In the third embodiment, the rotation angle of the leg rest 200 is set for each section from the first position to the foremost position of the seat 100. Thus, it is possible to minimize unnecessary rotation of the leg rest 200 and thus to minimize the occurrence of malfunction of the leg rest 200, compared to the second embodiment.

The controller 30 may determine the moving distance of the seat 100 in the upward-downward direction based on the number of revolutions of the second drive motor 12 detected by the sensing unit 40. The controller 30 may control operation of the third drive motor 21 when the seat 100 is moved upwards beyond a predetermined second position from the lowermost position.

As shown in FIG. 5, a rotation limit section of the leg rest 200 according to movement of the seat 100 in the upward-downward direction may be set. The point B in FIG. 5 may correspond to the predetermined second position.

The second position may be variously set by a designer depending on the type of vehicle or the type of seat 100.

As shown in FIG. 6, the seat 100 may be moved upwards from the lowermost position in the order from (a)-(f). As illustrated in FIG. 6, position(c) shows the state in which the seat 100 reaches the second position. The controller 30 may limit the rotation angle of the leg rest 200 when the seat 100 is moved beyond the second position. In addition, the controller 30 may control the rotation angle of the third drive motor 21 based on the limited rotation angle.

The controller 30 may determine whether the seat 100 is moved upward beyond the predetermined second position from the lowermost position using the sensing unit 40. Upon determining that the seat 100 is moved upward beyond the second position, the controller 30 may control the third drive motor 21 to rotate the leg rest 200 downwards. An embodiment related to control of the third drive motor 21 is described below.

Upon determining that the seat 100 moving in the upward-downward direction is located at the predetermined second position using the sensing unit 40, the controller 30 may control operation of the third drive motor 21 such that the leg rest 200 is rotated to the lowermost position.

In a first embodiment, the controller 30 rotates the leg rest 200 to the lowermost position when the seat 100 is moved beyond the second position. Upon determining that the position of the seat 100 in the upward-downward direction corresponds to the second position or a position above the second position, when the leg rest 200 is in a deployed state, the controller 30 may perform control such that the leg rest 200 is rotated to the lowermost position or such that, when the leg rest 200 is in a non-deployed state, the rotation angle of the leg rest 200 is limited to 0 degrees and thus the leg rest 200 is prevented from being deployed.

Positions (g) and (h) of FIG. 6 show the first embodiment.

Accordingly, it is possible to completely prevent collision between the leg rest 200 and the interior part of the vehicle.

The controller 30 may control operation of the third drive motor 21 such that the rotation angle of the leg rest 200 is limited according to the distance by which the seat 100 is moved from the predetermined second position toward the uppermost position.

In a second embodiment, the controller 30 rotates the leg rest 200 downward when the seat 100 is moved beyond the second position. The controller 30 may gradually reduce the allowable rotation angle of the leg rest 200 at a predetermined rate (refer to the slope indicated by the line (A) shown in the graph of FIG. 7) as the seat 100 is moved upward beyond the second position, which corresponds to the point B, toward the uppermost position. Accordingly, the leg rest 200 may be gradually rotated downward as the seat 100 is moved upward beyond the second position.

Accordingly, even when the seat 100 is moved beyond the second position, the rotation angle of the leg rest 200 is limited to a certain degree so that the leg rest 200 is capable of being rotated to the limited rotation angle. As a result, the leg rest 200 may be rotated within a reduced range.

The controller 30 may divide the distance from the predetermined second position to the uppermost position of the seat 100 into predetermined regions. The controller 30 may control operation of the third drive motor 21 such that the rotation angle of the leg rest 200 is limited in stages from the region closest to the second position to the region closest to the uppermost position.

In a third embodiment, the controller 30 rotates the leg rest 200 downward when the seat 100 is moved beyond the second position. The controller 30 may divide the distance from the second position, which corresponds to the point B, to the uppermost position of the seat 100 into predetermined regions. The controller 30 may reduce the allowable rotation angle of the leg rest 200 in stages from the region closest to the second position to the region closest to the uppermost position, as indicated by the line (B) shown in the graph of FIG. 7. Accordingly, the controller 30 may perform control such that the leg rest 200 is rotated downwards to the limited rotation angle set for each section as the seat 100 is moved upwards.

In the third embodiment, the rotation angle of the leg rest 200 is set for each section from the second position to the uppermost position of the seat 100. Thus, it is possible to minimize unnecessary rotation of the leg rest 200 and thus to minimize the occurrence of malfunction of the leg rest 200, compared to the second embodiment.

Figure 8:
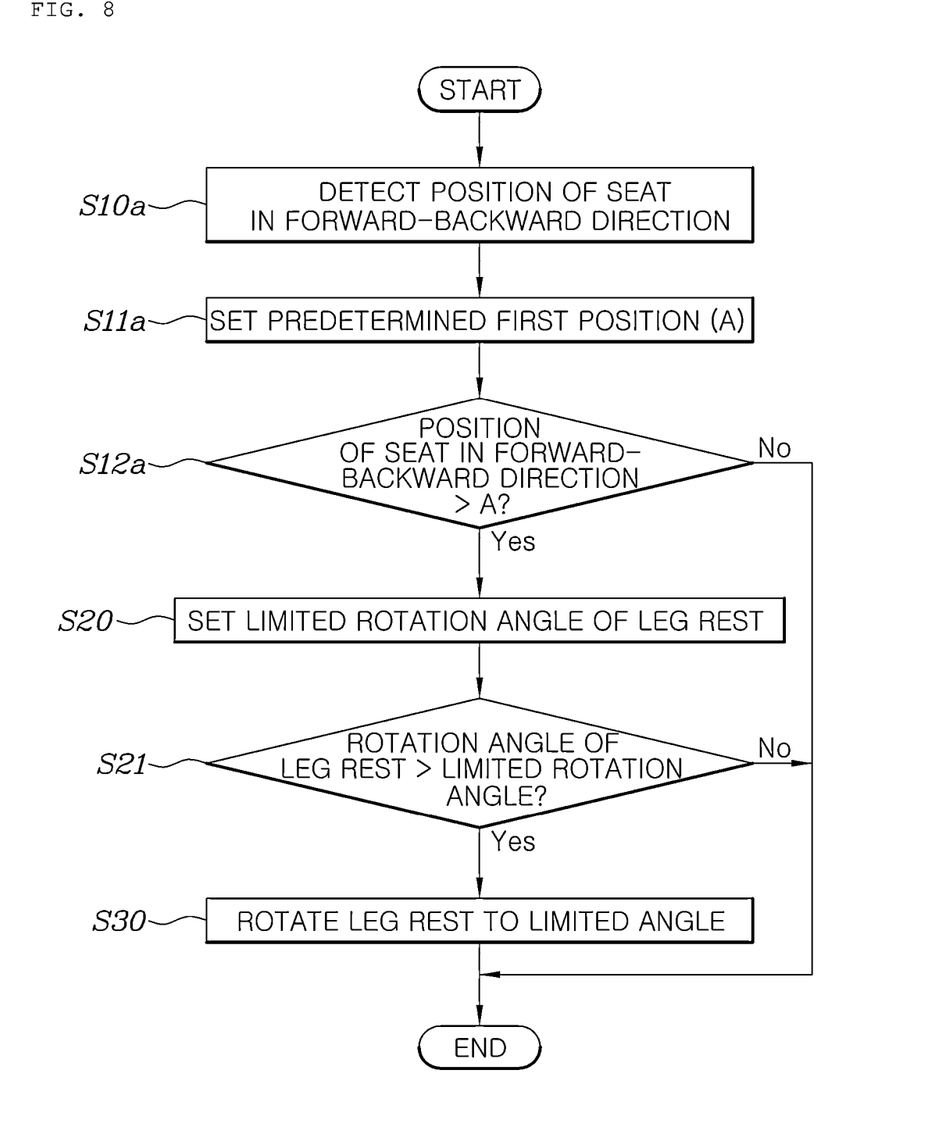
FIGS. 8 and 9 are flowcharts showing a seat-interlocking leg rest control method according to an embodiment of the present disclosure.
Figure 9:
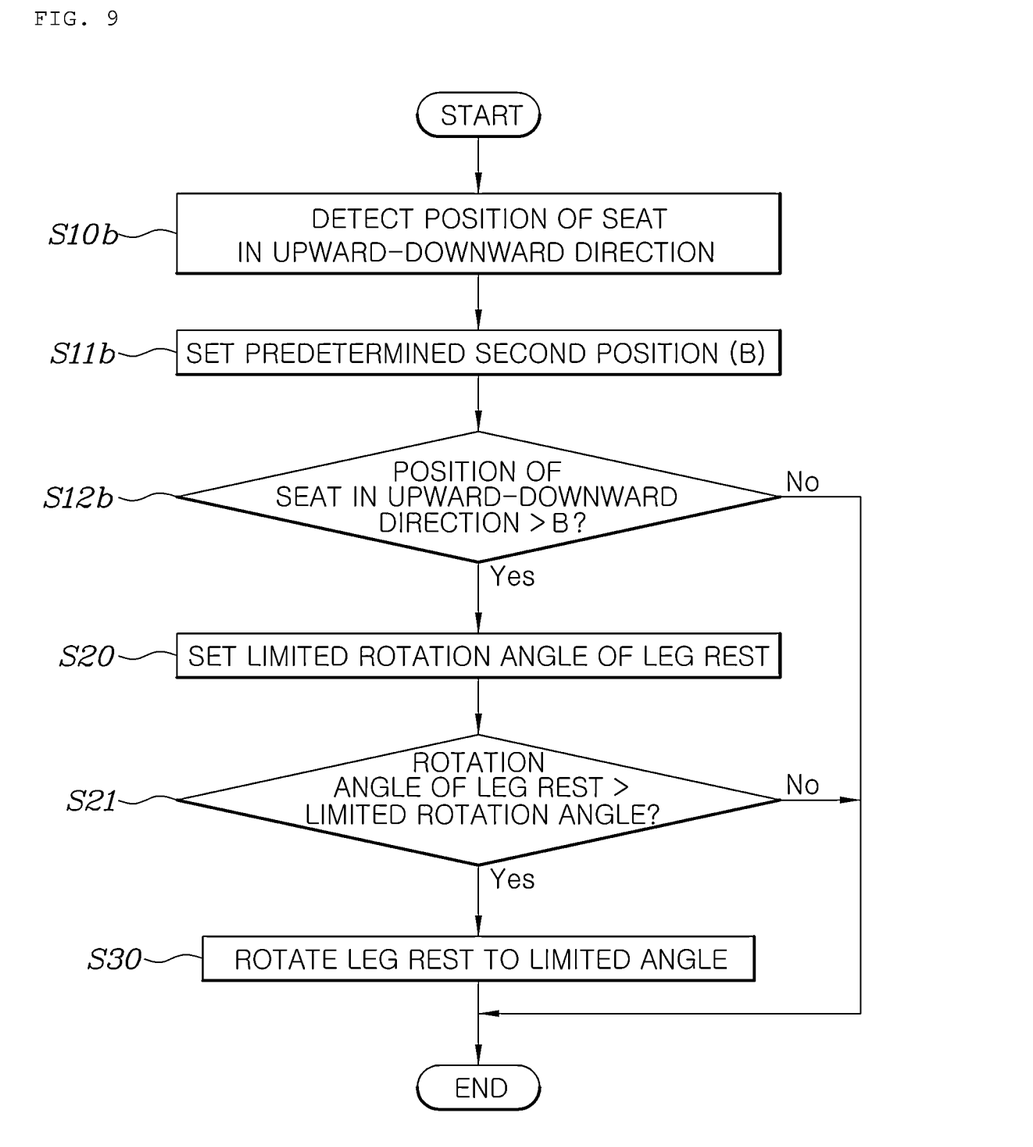

FIGS. 8 and 9 are flowcharts showing a seat-interlocking leg rest control method according to an embodiment of the present disclosure.

Hereinafter, an embodiment of the seat-interlocking leg rest control method according to the present disclosure is described with reference to FIGS. 8 and 9.

FIG. 8 shows a method of controlling the leg rest 200 according to movement of the seat 100 in the forward-backward direction. FIG. 9 shows a method of controlling the leg rest 200 according to movement of the seat 100 in the upward-downward direction.

The seat-interlocking leg rest control method according to the present disclosure includes a step (S10a or S10b) of detecting the position of the seat 100 in the forward-backward direction or the position of the seat 100 in the upward-downward direction. The control method also includes a step (S30) of limiting the rotation angle of the leg rest 200, which is rotatably coupled to the seat 100, based on at least one of the position of the seat 100 in the forward-backward direction or the position of the seat 100 in the upward-downward direction detected in the detecting step (S10).

The seat-interlocking leg rest control method may further include, before the limiting step (S30), a step (S11a) of setting a predetermined first position in a moving track of the seat 100 in the forward-backward direction and a step (S12a) of comparing the position of the seat 100 detected in the detecting step (S10a) with the predetermined first position. The limiting step (S30) may be performed such that the rotation angle of the leg rest 200 is limited when the seat 100 is located ahead of or beyond the predetermined first position.

The seat-interlocking leg rest control method may further include a step (S20) of setting a limited rotation angle of the leg rest 200 based on the distance from the predetermined first position to the position of the seat 100 ahead of the first position and a step (S21) of comparing the limited rotation angle with the current rotation angle of the leg rest 200. When the current rotation angle of the leg rest 200 is greater than the limited rotation angle, the limiting step (S30) may be performed such that the leg rest 200 is rotated to the limited rotation angle.

The seat-interlocking leg rest control method may further include, before the limiting step (S30), a step (S11b) of setting a predetermined second position in a moving track of the seat 100 in the upward-downward direction. The control method may also include a step (S12b) of comparing the position of the seat 100 detected in the detecting step (S10b) with the predetermined second position. The limiting step (S30) may be performed such that the rotation angle of the leg rest 200 is limited when the seat 100 is located above the predetermined second position.

The seat-interlocking leg rest control method may further include a step (S20) of setting a limited rotation angle of the leg rest 200 based on the distance from the predetermined second position to the position of the seat 100 above the second position. The control method may further include a step (S21) of comparing the limited rotation angle with the current rotation angle of the leg rest 200. When the current rotation angle of the leg rest 200 is greater than the limited rotation angle, the limiting step (S30) may be performed such that the leg rest 200 is rotated to the limited rotation angle.

As should be apparent from the above description, according to the seat-interlocking leg rest control system and method of the present disclosure, the position of the seat in the forward-backward direction and the upward-downward direction is detected. The controller limits the rotation angle of the leg rest based on the position of the seat in the forward-backward direction and the upward-downward direction. The controller controls the second actuator such that the leg rest is rotated downwards to the limited rotation angle, thereby preventing the leg rest, the second actuator, or an interior part of a vehicle from being damaged due to collision between the leg rest and the interior part of the vehicle.

Although specific embodiments of the present disclosure have been disclosed for illustrative purposes, those of ordinary skill in the art should appreciate that various modifications, additions, and substitutions are possible, without departing from the scope and spirit of the technical concept as disclosed in the accompanying claims.

What is claimed is:

1. A seat-interlocking leg rest control system comprising:
   a first actuator configured to move a seat for a vehicle, the seat having a seat cushion and a seatback, in a forward-backward direction or an upward-downward direction of the vehicle;
   a second actuator configured to rotate a leg rest, rotatably coupled to a front end portion of the seat cushion, in the upward-downward direction; and
   a controller connected to the first actuator and the second actuator to control operation of the second actuator such that a rotation angle of the leg rest is limited based on a position of the seat,
   wherein the first actuator comprises a first drive motor configured to cause the seat to slide in the forward-backward direction and a second drive motor configured to move the seat in the upward-downward direction,
   wherein the second actuator comprises a third drive motor coupled to the front end portion of the seat cushion to rotate the leg rest,
   wherein the seat-interlocking leg rest control system further comprises a sensing unit configured to detect a number of revolutions of each of the first drive motor, the second drive motor, and the third drive motor, the number of revolutions being a number of revolutions counted by accumulating a number of forward or reverse revolutions that the drive motor rotates, and
   wherein the controller controls operation of the third drive motor to limit the rotation angle of the leg rest and to allow the leg rest to rotate downwards within a limited rotation angle range, based on at least one of the number of revolutions of the first drive motor or the number of revolutions of the second drive motor detected by the sensing unit.

2. The seat-interlocking leg rest control system according to claim 1,
   wherein each of the first drive motor and the second drive motor is provided with a Hall sensor, and
   wherein the sensing unit senses rotation of the first drive motor and the second drive motor using the Hall sensor.

3. The seat-interlocking leg rest control system according to claim 1, wherein the controller determines a moving distance of the seat in the forward-backward direction based on the number of revolutions of the first drive motor detected by the sensing unit, and controls operation of the third drive motor when the seat is moved forwards beyond a predetermined first position from a rearmost position.

4. The seat-interlocking leg rest control system according to claim 3, wherein, upon determining that the seat is located at the predetermined first position using the sensing unit, the controller controls operation of the third drive motor such that the leg rest is rotated to a lowermost position or a predetermined position.

5. The seat-interlocking leg rest control system according to claim 3, wherein the controller controls operation of the third drive motor such that a rotation angle of the leg rest is limited according to a distance by which the seat is moved from the predetermined first position toward a frontmost position.

6. The seat-interlocking leg rest control system according to claim 3, wherein the controller divides a distance from the predetermined first position to a frontmost position of the seat into predetermined regions, and controls operation of the third drive motor such that a rotation angle of the leg rest is limited in stages based on the predetermined regions.

7. The seat-interlocking leg rest control system according to claim 1, wherein the controller determines a moving distance of the seat in the upward-downward direction based on the number of revolutions of the second drive motor detected by the sensing unit, and controls operation of the third drive motor when the seat is moved upwards beyond a predetermined second position from a lowermost position.

8. The seat-interlocking leg rest control system according to claim 7, wherein, upon determining that the seat moving in the upward-downward direction is located at the predetermined second position using the sensing unit, the controller controls operation of the third drive motor such that the leg rest is rotated to a lowermost position.

9. The seat-interlocking leg rest control system according to claim 7, wherein the controller controls operation of the third drive motor such that a rotation angle of the leg rest is limited according to a distance by which the seat is moved from the predetermined second position toward an uppermost position.

10. The seat-interlocking leg rest control system according to claim 7, wherein the controller divides a distance from the predetermined second position to an uppermost position of the seat into predetermined regions, and controls operation of the third drive motor such that a rotation angle of the leg rest is limited in stages based on the predetermined regions.

11. A method of controlling a seat-interlocking leg rest control system, the seat-interlocking leg rest control system comprising:
a first actuator configured to move a seat for a vehicle, the seat having a seat cushion and a seatback, in a forward-backward direction or an upward-downward direction of the vehicle;
a second actuator configured to rotate a leg rest, rotatably coupled to a front end portion of the seat cushion, in the upward-downward direction; and
a controller connected to the first actuator and the second actuator to control operation of the second actuator such that a rotation angle of the leg rest is limited based on a position of the seat,
wherein the first actuator comprises a first drive motor configured to cause the seat to slide in the forward-backward direction and a second drive motor configured to move the seat in the upward-downward direction,
wherein the second actuator comprises a third drive motor coupled to the front end portion of the seat cushion to rotate the leg rest,
wherein the seat-interlocking leg rest control system further comprises a sensing unit configured to detect a number of revolutions of each of the first drive motor, the second drive motor, and the third drive motor, the number of revolutions being a number of revolutions counted by accumulating a number of forward or reverse revolutions that the drive motor rotates, and
wherein the controller controls operation of the third drive motor to limit the rotation angle of the leg rest and to allow the leg rest to rotate downwards within a limited rotation angle range, based on at least one of the number of revolutions of the first drive motor or the number of revolutions of the second drive motor detected by the sensing unit,
the method comprising:
detecting the position of the seat in the forward-backward direction or the position of the seat in the upward-downward direction; and
limiting the rotation angle of the leg rest, rotatably coupled to the seat based on at least one of a detected position of the seat in the forward-backward direction or a detected position of the seat in the upward-downward direction.

12. The method of claim 11, further comprising, before the limiting:
setting a predetermined first position in a moving track of the seat in the forward-backward direction; and
comparing the detected position of the seat with the predetermined first position,
wherein the limiting is performed such that the rotation angle of the leg rest is limited when the seat is located ahead of the predetermined first position.

13. The method of claim 12, further comprising:
setting a limited rotation angle of the leg rest based on a distance from the predetermined first position to a position of the seat ahead of the predetermined first position; and
comparing the limited rotation angle with a current rotation angle of the leg rest,
wherein, when the current rotation angle of the leg rest is greater than the limited rotation angle, the limiting is performed such that the leg rest is rotated to the limited rotation angle.

14. The method of claim 11, further comprising, before the limiting:
setting a predetermined second position in a moving track of the seat in the upward-downward direction; and
comparing the detected position of the seat with the predetermined second position,
wherein the limiting is performed such that the rotation angle of the leg rest is limited when the seat is located above the predetermined second position.

15. The method of claim 14, further comprising:
setting a limited rotation angle of the leg rest based on a distance from the predetermined second position to a position of the seat above the predetermined second position; and
comparing the limited rotation angle with a current rotation angle of the leg rest, wherein, when the current rotation angle of the leg rest is greater than the limited rotation angle, the limiting is performed such that the leg rest is rotated to the limited rotation angle.

\* \* \* \* \*